United States Patent
Li et al.

(10) Patent No.: US 11,797,764 B2
(45) Date of Patent: Oct. 24, 2023

(54) METHOD AND DEVICE FOR TEXT LABELING BASED ON DYNAMIC CONVOLUTION FEATURE EXTRACTION

(71) Applicant: Beijing Xiaomi Pinecone Electronics Co., Ltd., Beijing (CN)

(72) Inventors: Jingwei Li, Beijing (CN); Yuhui Sun, Beijing (CN); Xiang Li, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 16/929,942

(22) Filed: Jul. 15, 2020

(65) Prior Publication Data

US 2021/0271811 A1   Sep. 2, 2021

(30) Foreign Application Priority Data

Feb. 28, 2020   (CN) .......................... 202010129824.4

(51) Int. Cl.
*G06F 40/253* (2020.01)
*G06F 40/279* (2020.01)
(Continued)

(52) U.S. Cl.
CPC .......... *G06F 40/253* (2020.01); *G06F 40/166* (2020.01); *G06F 40/279* (2020.01);
(Continued)

(58) Field of Classification Search
None
See application file for complete search history.

(56) References Cited

U.S. PATENT DOCUMENTS 8,918,317 B2 * 12/2014 Fritsch .................... G10L 15/26
704/235
9,442,910 B2 *  9/2016 Liu ......................... G06F 40/30
(Continued)

FOREIGN PATENT DOCUMENTS

CN    107291795 A    10/2017
CN    110347836 A    10/2019
(Continued)

OTHER PUBLICATIONS

Nal Kalchbrenner et al. "A Convolutional Neural Network for Modelling Sentences", Apr. 8, 2014, 11 pages https://doi.org/10.48550/arXiv.1404.2188 (Year: 2014).*
(Continued)

*Primary Examiner* — Benjamin Smith
(74) *Attorney, Agent, or Firm* — Oblon, McClelland, Maier & Neustadt, L.L.P.

(57) ABSTRACT

Aspects of the present disclosure relate to a text labeling method and device, and more specifically to the field of deep learning and solving the problem of low efficiency and low accuracy of a feature extraction process. The method can include processing input information to obtain word embedding representation information of the input information, performing dynamic convolution feature extraction on the word embedding representation information to obtain a classification result of each character from the word embedding representation information, and inserting a label into the input information based on the classification result.

8 Claims, 8 Drawing Sheets

(51) Int. Cl.
*G06F 40/166* (2020.01)
*G06N 3/08* (2023.01)
*G10L 15/26* (2006.01)
*G06F 40/30* (2020.01)

(52) U.S. Cl.
CPC .............. *G06F 40/30* (2020.01); *G06N 3/08* (2013.01); *G10L 15/26* (2013.01)

(56) References Cited

U.S. PATENT DOCUMENTS

| | | | |
|---|---|---|---|
| 9,721,573 B2* | 8/2017 | Fritsch | G10L 15/197 |
| 9,811,517 B2* | 11/2017 | Liu | G06F 40/30 |
| 10,388,272 B1* | 8/2019 | Thomson | G10L 15/063 |
| 10,573,312 B1* | 2/2020 | Thomson | G10L 15/187 |
| 10,672,383 B1* | 6/2020 | Thomson | G10L 15/183 |
| 10,896,342 B2* | 1/2021 | Gavrilyuk | G06F 16/73 |
| 10,929,759 B2* | 2/2021 | Shinn | G06N 5/04 |
| 10,971,153 B2* | 4/2021 | Thomson | G10L 15/22 |
| 11,017,778 B1* | 5/2021 | Thomson | G10L 15/22 |
| 11,128,579 B2* | 9/2021 | Magliozzi | H04L 51/066 |
| 11,151,992 B2* | 10/2021 | Cui | B25J 9/163 |
| 11,170,761 B2* | 11/2021 | Thomson | G10L 15/06 |
| 11,216,615 B2* | 1/2022 | Liang | G06F 40/279 |
| 11,521,071 B2* | 12/2022 | Kim | G06F 40/58 |
| 11,537,875 B2* | 12/2022 | Kozhaya | G06N 3/08 |
| 2003/0163310 A1* | 8/2003 | Caldwell | H04N 21/440236 704/235 |
| 2004/0138881 A1* | 7/2004 | Divay | G10L 15/1807 704/231 |
| 2010/0076761 A1* | 3/2010 | Juergen | G10L 19/0018 704/235 |
| 2012/0022950 A1* | 1/2012 | Gilbert | H04M 3/53333 705/14.66 |
| 2014/0214406 A1* | 7/2014 | Liu | G06F 40/289 704/9 |
| 2014/0350918 A1* | 11/2014 | Liu | G06F 40/30 704/9 |
| 2015/0095025 A1* | 4/2015 | Fritsch | G10L 19/0018 704/231 |
| 2018/0131645 A1* | 5/2018 | Magliozzi | G06F 40/30 |
| 2019/0080252 A1* | 3/2019 | Shinn | G06F 9/4413 |
| 2019/0206400 A1* | 7/2019 | Cui | G10L 15/1815 |
| 2020/0151555 A1* | 5/2020 | Kozhaya | G06N 3/08 |
| 2020/0175961 A1* | 6/2020 | Thomson | G10L 15/063 |
| 2020/0175962 A1* | 6/2020 | Thomson | G10L 15/183 |
| 2020/0175987 A1* | 6/2020 | Thomson | G10L 15/22 |
| 2020/0243094 A1* | 7/2020 | Thomson | G10L 15/26 |
| 2020/0364576 A1* | 11/2020 | Kim | G06F 40/30 |
| 2021/0082400 A1* | 3/2021 | Vishnoi | G06F 40/30 |
| 2021/0233530 A1* | 7/2021 | Thomson | G10L 15/26 |
| 2022/0122587 A1* | 4/2022 | Thomson | G10L 15/06 |
| 2022/0139386 A1* | 5/2022 | Li | G10L 15/19 704/9 |

FOREIGN PATENT DOCUMENTS

| | | | | |
|---|---|---|---|---|
| CN | 110674305 A | | 1/2020 | |
| CN | 111368026 A | * | 7/2020 | |
| CN | 111951792 A | * | 11/2020 | G06N 3/0454 |
| CN | 112906348 A | * | 6/2021 | G06F 16/31 |
| WO | WO 2019/229769 A1 | | 12/2019 | |

OTHER PUBLICATIONS

Jason Brownlee; A Gentle Introduction to Pooling Layers for Convolutional Neural Networks; Apr. 22, 2019, 31 pages; https://machinelearningmastery.com/pooling-layers-for-convolutional-neural-networks/ (Year: 2019).*
MLNotebook, Convolutional Neural Networks—Basics—An Introduction to CNNs and Deep Learning; Apr. 7, 2017; 15 pages; https://mlnotebook.github.io/post/CNN1/ (Year: 2017).*
Sumit Saha; A Comprehensive Guide to Convolutional Neural Networks—the ELI5 way; Dec. 15, 2018; 13 pages; https://towardsdatascience.com/a-comprehensive-guide-to-convolutional-neural-networks-the-eli5-way-3bd2b1164a53 (Year: 2018).*
Yinpeng Chen et al., Dynamic Convolution: Attention over Convolution Kernels, Dec. 7, 2019, 11 pages, arXiv:1912.03458v1 https://doi.org/10.48550/arXiv.1912.03458 (Year: 2019).*
Yinpeng Chen et al. "Dynamic Convolution: Attention over Convolution Kernels", Dec. 7, 2019, 11 pages, https://doi.org/10.48550/arXiv.1912.03458 (Year: 2019).*
M. Á. Tündik and G. Szaszák, "Joint Word- and Character-level Embedding CNN-RNN Models for Punctuation Restoration," 2018 9th IEEE International Conference on Cognitive Infocommunications (CogInfoCom), Budapest, Hungary, 2018, pp. 000135-000140, doi: 10.1109/CogInfoCom.2018.8639876. (Year: 2018).*
Gale, William & Parthasarathy, Sarangarajan. (2017). Experiments in Character-Level Neural Network Models for Punctuation. 2794-2798. DOI: 10.21437/Interspeech.2017-1710. (Year: 2017).*
Szaszák, György & Tündik, MátéÁkos. (2019). Leveraging a Character, Word and Prosody Triplet for an ASR Error Robust and Agglutination Friendly Punctuation Approach. 2988-2992. DOI: 10.21437/Interspeech.2019-2132. (Year: 2019).*
Wu, F., A. Fan, et al., Pay Less Attention With Lightweight and Dynamic Convolutions, Feb. 22, 2019; 14 pgs.
Extended European Search Report dated Jan. 28, 2021 in European Patent Application No. 20188236.2, 8 pages.
Xiaoyin Che, et al. "Punctuation Prediction for Unsegmented Transcript Based on Word Vector" Retrieved from the Internet: URL:http://www.lrec-conf.org/proceedings/lrec2016/pdf/_103Paper.pdf, XP055762525, Jan. 1, 2016, pp. 654-658.
Jiangyan Yi, et al., "Self-Attention Based Model for Punctuation Prediction Using Word and Speech Embeddings" ICASSP 2019—2019 IEEE International Conference on Acoustics, Speech and Signal Processing (ICASSP), IEEE, XP033564836, May 12, 2019, pp. 7270-7274.
William Gale, et al., "Experiments in Character-Level Neural Network Models for Punctuation" InterSpeech 2017, XP055762527, Jan. 1, 2017, pp. 2794-2798 and cover page.
Yijun Xiao, et al., "Efficient Character-Level Document Classification by Combining Convolution and Recurrent Layers" Arxiv. Org., Cornell University Library, XP080680631, Feb. 1, 2016, 10 pages.
Zhang, et al., "Semi-supervised Question Classification with Jointly Learning Question and Answer Representations", Journal of Chinese Information Processing, vol. 31, No. 1, Jan. 15, 2017 (7 pages).
Office Action dated Mar. 10, 2023, in Chinese Patent Application No. 202010129824.4, filed Feb. 28, 2020, 5 pages.

* cited by examiner

METHOD AND DEVICE FOR TEXT LABELING BASED ON DYNAMIC CONVOLUTION FEATURE EXTRACTION

CROSS-REFERENCE TO RELATED APPLICATIONS

This application claims the priority to the Chinese Patent Application No. 202010129824.4, filed on Feb. 28, 2020, the disclosure of which is incorporated therein by reference in its entirety.

TECHNICAL FIELD

The present disclosure relates to the field of deep learning, and in particular to a text labeling method and device.

BACKGROUND

In many speech recognition application scenarios, a result of speech recognition usually does not contain any punctuation marks. The text of the recognition result obtained in this way has no pause. If such a text without pauses is directly delivered to a downstream task, execution quality of the downstream task will be deteriorated because the downstream task is sensitive to pauses and punctuations. Therefore, the overall processing quality of the system can be improved by adding punctuations to the text of the speech recognition result.

For example, in the scene of a translation machine, a sentence spoken by the user is recognized by Automatic Speech Recognition (ASR for short) as "he bought a new car a plate number of which is Hu B96R11." This recognition result has a problem that there is no pause between the character "car" and "a plate number." The correct recognition result should be "he bought a new car, a plate number of which is Hu B96R11." However, only an unpunctuated recognition result is obtained because the ASR is provided with only the user's speech and does not have a function of making pauses. Due to the lack of punctuations, the meaning of the recognition result is not clear.

Such result displayed on the screen of the translation machine will affect the user experience. Further, if the unpunctuated speech recognition result is input into a translation model, the translation in a translation task may be inaccurate, because sentences without punctuations can cause ambiguity. Therefore, it is meaningful and important to punctuate the unpunctuated text.

Common punctuation prediction methods generally include the followings:
1. performing feature extraction on a sequence based on recurrent neural network (RNN) and performing punctuation prediction; and
2. performing feature extraction on a sequence based on a self-attention mechanism and performing punctuation prediction.

The method based on a recurrent neural network has the problem that the speed of feature extraction is slow and the speech input may be forgotten. This is because the recurrent neural network has a dependency in the time sequence. In other words, the result of the next moment depends on the output of the previous moment, causing the speed of feature extraction to be slow if the length of speech is long. Besides, due to the problem of the model, the speech input may be forgotten if the length of the speech is long.

Although the method based on the self-attention mechanism has no dependency in the time sequence, features thereof at each moment are obtained by weighting all context information, so that the efficiency is low if the input text is very long. Moreover, since whether to add punctuations is determined based on all context information, the accuracy of the determination will be affected if there is a large amount of context information. This can result in a low accuracy in a process of punctuating a long text.

SUMMARY

Aspects of the present disclosure can provide a text labeling method and device. A first aspect of the present disclosure can provide a text labeling method that can include processing input information to obtain word embedding representation information of the input information, performing dynamic convolution feature extraction on the word embedding representation information to obtain a classification result of each character from the word embedding representation information, and inserting a label into the input information based on the classification result.

Optionally, processing input information to obtain word embedding representation information of the input information can include converting each character in the input information into a unique word indicator of the character, and performing a word embedding layer processing on the word indicator to obtain a word embedding representation corresponding to each word indicator, and form the word embedding representation information of the input information.

Performing dynamic convolution feature extraction on the word embedding representation information to obtain a classification result of each character from the word embedding representation information can include using word embedding layer information in a time window corresponding to each character as context information for feature extraction; and performing dynamic convolution feature extraction on the context information to obtain the classification result of each character from the word embedding representation information.

Optionally, inserting a label into the input information based on the classification result includes determining punctuation information behind each character based on the classification result of each character; and inserting the punctuation information into the input information to be located behind the corresponding character.

A second aspect of the present disclosure further provides a text labeling device, including a first input information processing module that is configured to process input information to obtain word embedding representation information of the input information, a dynamic convolution module that is configured to perform dynamic convolution feature extraction on the word embedding representation information to obtain classification result of each character from the word embedding representation information, and a labeling module that is configured to insert a label into the input information based on the classification result.

The first input information processing module can include a word indicator layer processing unit, configured to convert each character in the input information into a unique word indicator of the character, and a word embedding layer processing unit, configured to perform word embedding layer processing on the word indicator to obtain a word embedding representation corresponding to each word indicator, and form the word embedding representation information of the input information.

Optionally, the dynamic convolution module includes a context information obtaining unit, configured to use word embedding layer information in a time window corresponding to each character as the context information for feature extraction, and a feature extraction unit, configured to perform dynamic convolution feature extraction on the context information to obtain the classification result of each character from the word embedding representation information.

The labeling module can include a punctuation information obtaining unit, configured to determine punctuation information behind each character based on the classification result of each character, and a punctuation information inserting unit, configured to insert the punctuation information into the input information to be located behind the corresponding character.

A third aspect of the present disclosure provides a computer device having a processor and a memory storing processor executable instructions. The processor can be configured to process input information to obtain word embedding representation information of the input information, perform dynamic convolution feature extraction on the word embedding representation information to obtain the classification result of each character from the word embedding representation information, and insert a label into the input information based on the classification result.

According to a non-transitory computer-readable storage medium of the present disclosure, when instructions in the storage medium are executed by a processor of a mobile terminal, the mobile terminal is enabled to perform a text labeling method. The method can include processing input information to obtain word embedding representation information of the input information, performing dynamic convolution feature extraction on the word embedding representation information to obtain the classification result of each character from the word embedding representation information, and inserting a label into the input information based on the classification result.

The technical solutions provided by the embodiments of the present disclosure may include several beneficial effects. For example, after the input information is processed to obtain word embedding representation information of the input information, dynamic convolution feature extraction can be performed on the word embedding representation information to obtain the classification result of each character from the word embedding representation information. Subsequently, labels can be inserted into the input information based on the classification result. The feature extraction is completed through dynamic convolution, which realizes accurate and efficient punctuation labeling, and solves the problem of low efficiency and low accuracy in the feature extraction process.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present disclosure, and are used for explaining principles of the present disclosure together with the specification.

DETAILED DESCRIPTION

Figure 1:
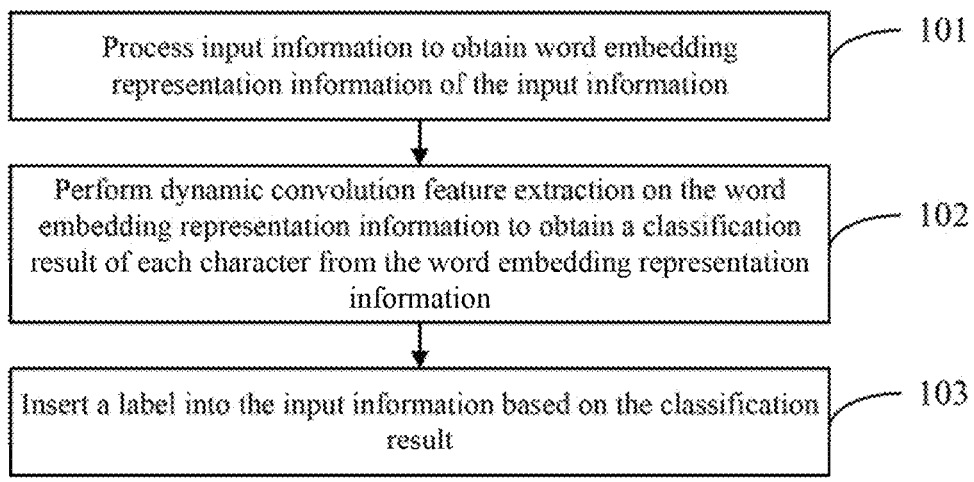
FIG. 1 is a flow chart showing a text labeling method according to an exemplary embodiment.

Exemplary embodiments will be described in detail herein, examples of which are shown in the drawings. When referring to the drawings below, unless otherwise indicated, the same numerals in different drawings represent the same or similar elements. The embodiments described in the following exemplary embodiments do not represent all embodiments consistent with the present disclosure. Rather, they are merely examples of devices and methods consistent with some aspects of the disclosure as detailed in the appended claims.

No matter the mechanism based on recurrent neural network or the mechanism based on self-attention is adopted, low efficiency and low accuracy are prone to occur in the process of feature extraction and punctuation prediction.

In view of the above matter, embodiments of the present disclosure provide a text labeling method and device that extract features through dynamic convolution feature extraction and insert labels based on the feature extraction, thereby solving the problem of low efficiency and low accuracy of the feature extraction process, improving the user experience, and improving the accuracy of downstream tasks of the speech recognition business.

An exemplary embodiment of the present disclosure provides a text labeling method. A process of labeling text using this method is shown in FIG. 1 and includes the following steps.

In step 101, input information is processed to obtain word embedding representation information of the input information. In this step, the input information is a text obtained through the speech recognition, and is input to a training stage model, so as to start the text labeling process. After a preliminary processing is made on the input information, the input information is divided into characters, and corresponding word embedding representation information is obtained.

In step 102, dynamic convolution feature extraction is performed on the word embedding representation information to obtain a classification result of each character from the word embedding representation information. In this step, a dynamic convolution feature extractor is used to perform feature processing on the word embedding representation information to obtain the classification result of each character from the word embedding information. Specifically, the classification result is a calculation result of a normalized exponential function/softmax function. Based on the classification result of each character, it is possible to determine the punctuation information to be labeled behind each character.

In step 103, a label is inserted into the input information based on the classification result. In this step, the punctuation to be labeled behind each character is determined based on the classification result of each character, and an accurate speech recognition result text is obtained after the label is inserted.

Figure 2:
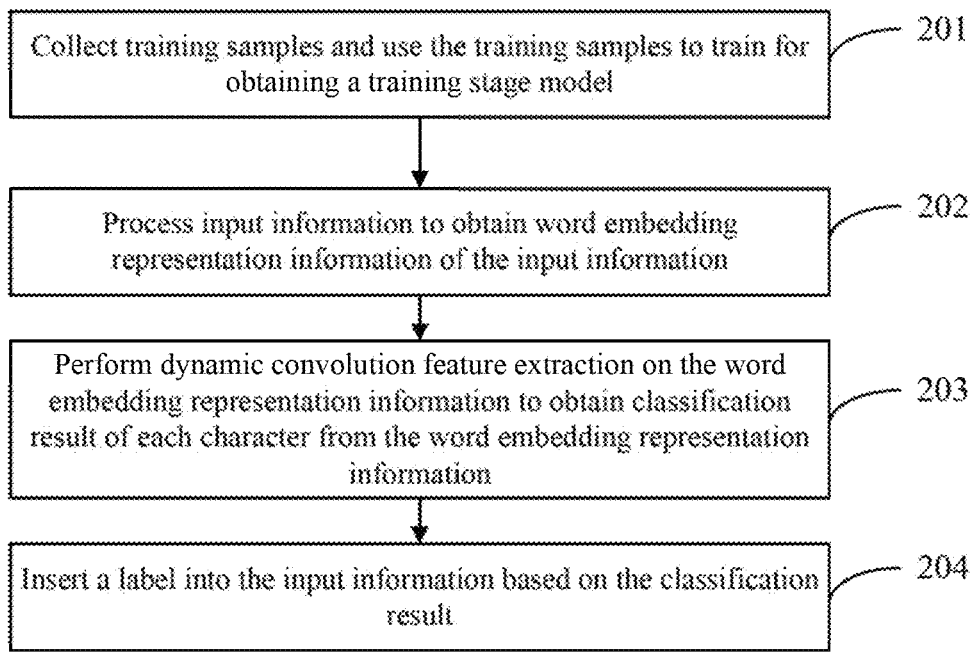
FIG. 2 is a flow chart of a text labeling method according to an exemplary embodiment.

An exemplary embodiment of the present disclosure further provides a text labeling method. The process of text labeling using this method is shown in FIG. 2 and includes the following steps.

In step 201, training samples are collected and used to perform training to obtain a training stage model. In this step, a large amount of punctuated text can be collected through web crawling and other means, and the text can be processed into parallel corpus of data sequence without punctuations and result sequence with punctuation to form a training corpus. The source end of the training corpus is a sequence without punctuations, and the target end is the type of punctuation added behind each character. The type of punctuation includes non-punctuation, period, comma, question mark and other punctuation types, which are denoted by "N", "。", "," and "?" respectively. Exemplarily, in the case that a Chinese text is punctuated automatically, a process of preprocessing training data to obtain training samples is shown in Table 1. First, in step, the original text is segmented to split the text of a sentence into characters, and these characters are separated with spaces. Second, in step2, on the basis of step1, the punctuation type predicted for each character is obtained according to whether a punctuation mark is behind the input character, and thus a parallel corpus for training is obtained, that is, a training sample.

the data with punctuations is processed into a source end without punctuations and a target end representing the result of punctuation classification.

At the input layer, the input information is split into individual characters. At the word indicator layer, each character at the source end is converted into an ID (unique identifier) in a predefined word list based on the word list. At the word embedding layer, the word embedding representation corresponding to each character is obtained based on the ID of each character.

Figure 4:
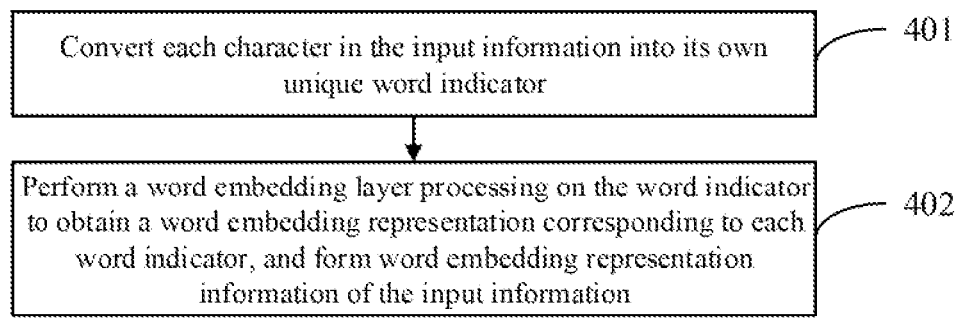
FIG. 4 is a flow chart of generating word embedding representation information according to an exemplary embodiment.

This step is shown in FIG. 4 and includes the following steps.

In step 401, each character in the input information is converted into a unique word indicator of the character. Specifically, a unique word indicator of each character in the input information, such as the ID in the predefined word list, is obtained through the above conversion.

In step 402, a word embedding layer processing is performed on the word indicator to obtain a word embedding representation corresponding to each word indicator, and form word embedding representation information of the input information. Specifically, at the word embedding layer, the word embedding representation corresponding to each character is obtained based on the ID of each character.

In step 203, dynamic convolution feature extraction is performed on the word embedding representation information to obtain the classification result of each character from the word embedding representation information.

Figure 5:
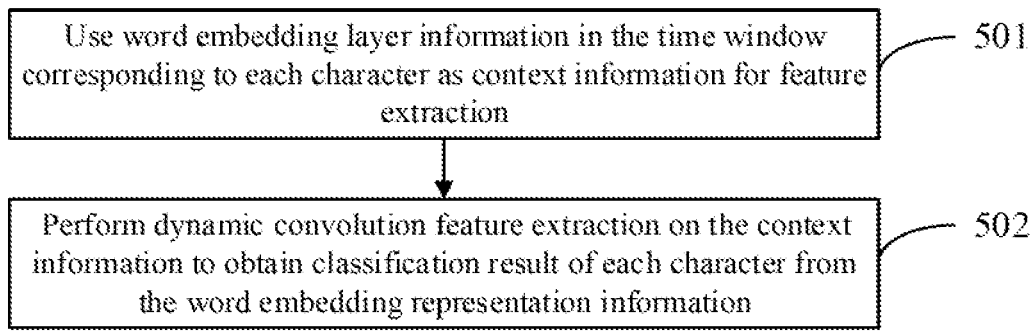
FIG. 5 is a flow chart showing dynamic convolution feature extraction according to an exemplary embodiment.

This step is shown in FIG. 5 and includes the following steps.

In step 501, the word embedding layer information in a time window corresponding to each character is used as context information for feature extraction. In this step, in the dynamic convolution layer, the word embedding representation information is input into the dynamic convolution feature extractor, and the word embedding layer information in the time window corresponding to each character is used as the context information for feature extraction.

In step 502, dynamic convolution feature extraction is performed on the context information to obtain a classification result of each character from the word embedding representation information. In this step, the feature extraction is performed by the dynamic convolution feature extractor to obtain the classification result of each character.

TABLE 1

Inputs: "我现在说的是中文,你听得明白吗?"
Step1: "我 现 在 说 的 是 中 文 , 你 听 得 明 白 吗?"
Step2: "我 现 在 说 的 是 中 文 你 听 得 明 白 吗"—"N N N N N N , N N N N N ?"
Outputs: source = "我 现 在 说 的 是 中 文 你 听 得 明 白 吗", target = "N N N N N N, N N N N N ?"

Then, the training samples are input into the model for training, and the training stage model is generated.

In step 202, dynamic convolution feature extraction is performed on the word embedding representation information to obtain the classification result of each character from the word embedding representation information.

Figure 3:
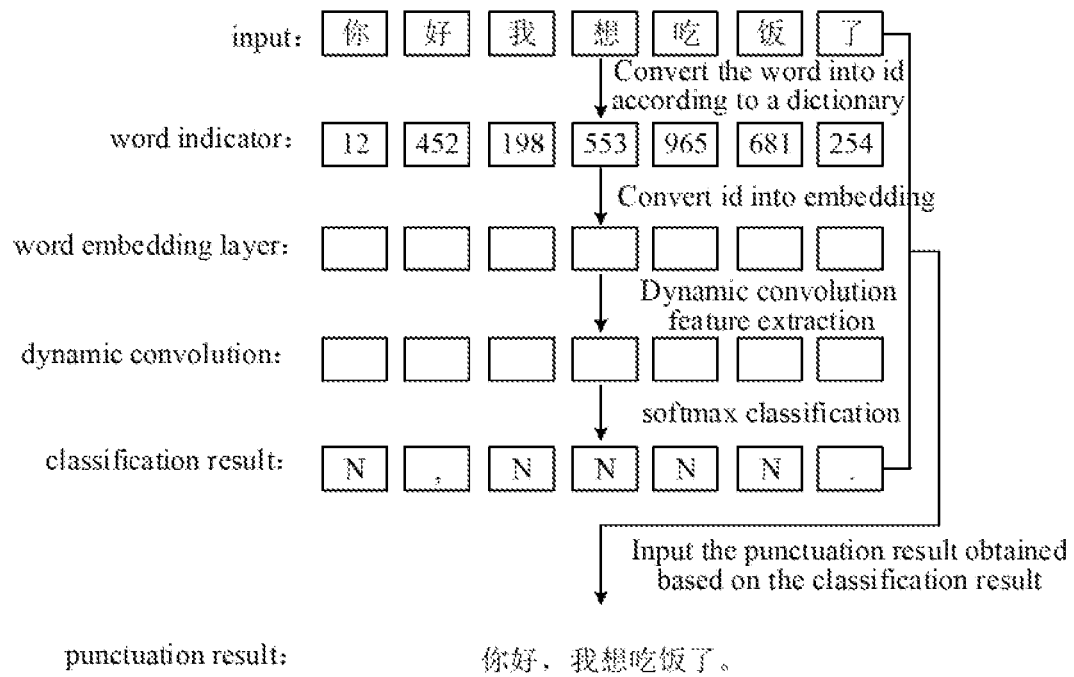
FIG. 3 is a schematic diagram showing an overall architecture of a training stage model according to an exemplary embodiment.

The overall architecture of the training stage model used in the embodiments of the present disclosure is shown in FIG. 3, and includes an input layer, a word indicator layer, a word embedding layer, a dynamic convolution layer, and a punctuation result layer. Through the training stage model, Specifically, the softmax classification of the features is performed using a fully connected layer to obtain the classification result of each character, that is, the classification result about the type of the punctuation behind each character.

Figure 6:
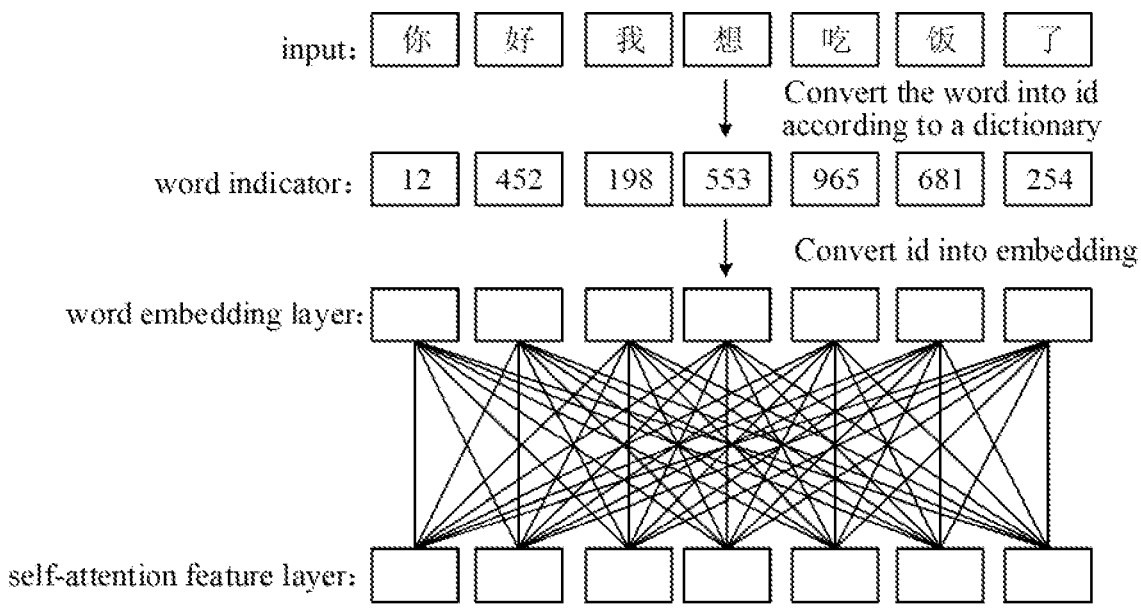
FIG. 6 is a schematic diagram of a feature extraction method based on the self-attention mechanism.
Figure 7:
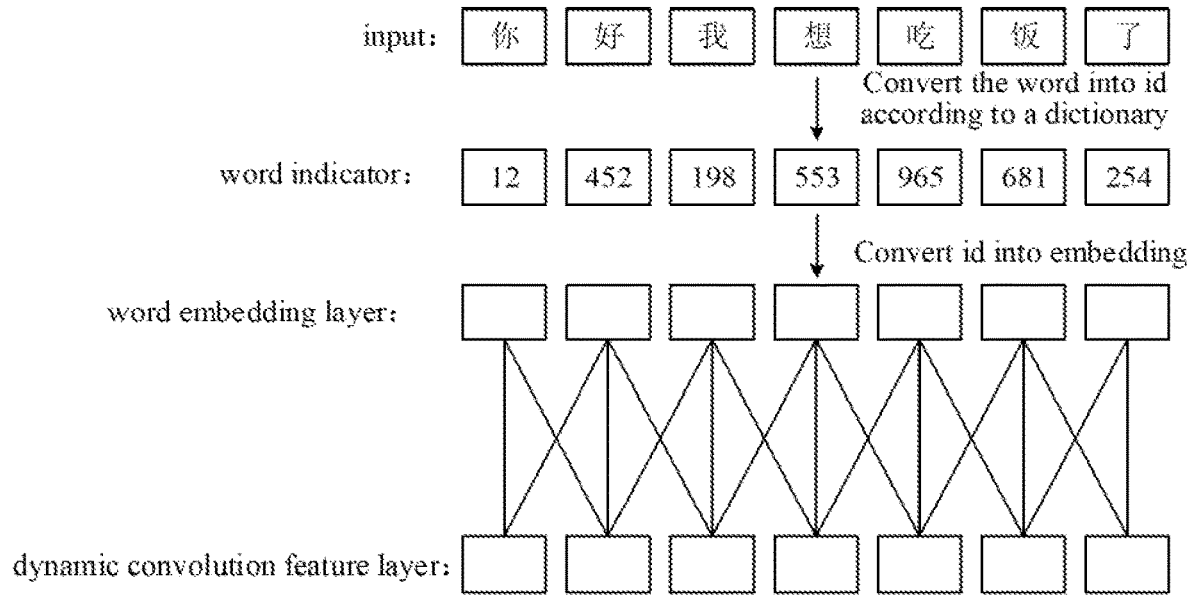
FIG. 7 is a schematic diagram showing the feature extraction method based on dynamic convolution according to an exemplary embodiment.

The feature extraction method of the dynamic convolution feature extractor is different from the feature extraction method of the feature extractor based on self-attention mechanism. The feature extraction method of the feature extractor based on the self-attention mechanism uses the input at all times as the context information for feature extraction, as shown in FIG. 6. The feature extractor based on dynamic convolution only uses the input in the window at current time as the context information for feature extraction, as shown in FIG. 7, which has advantages in automatically adding labels to the text, especially in the task of adding punctuations. This is because that when determining whether a punctuation is needed behind a character in the text, only the information of the character near this character is needed, and the model does not need to know the entire input information. As for the feature extraction method based on self-attention, the feature at each moment is obtained from the input at all moments of the previous layer. On the contrary, the output of the feature extractor based on the dynamic convolution for each character/time is only obtained based on the input within a corresponding time window in the previous layer.

Further, dynamic convolution is also different from the traditional convolution feature extractor. The dynamic convolution feature extractor has a different convolution kernel at each time, and the convolution kernel is obtained according to the input at the current time. The traditional convolution feature extractor has the same convolution kernel at each moment. Since the convolution operation is used, the parallelism of the algorithm is relatively high, so the model is much faster than the feature extractor based on the recurrent neural network and the feature extractor based on the self-attention mechanism.

In step 204, a label is inserted into the input information based on the classification result.

Figure 8:
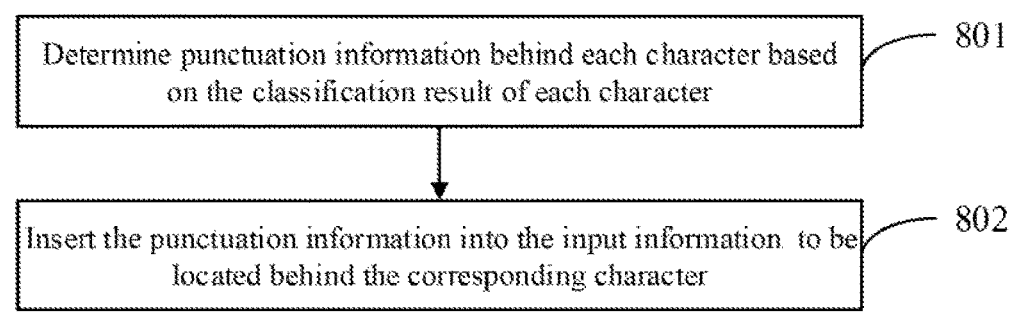
FIG. 8 is a flowchart of inserting labels according to an exemplary embodiment.

This step is shown in FIG. 8 and includes the following steps.

In step 801, punctuation information behind each character is determined based on the classification result of each character. In this step, based on the classification result of each character, that is, the classification result of the punctuation that can be added/inserted behind each character, the punctuation information behind each character is determined.

In step 802, the punctuation information is inserted behind the corresponding character in the input information. In this step, the punctuation information is inserted behind the character to obtain the final accurate speech recognition result with punctuations. The speech recognition result with punctuations can be directly output to the user as a processing result, and can also be provided to other downstream services. The downstream service performs tasks based on this speech recognition result, thus improving the accuracy.

Figure 9:
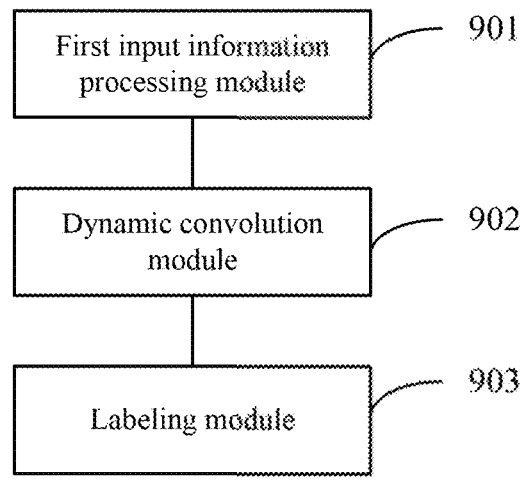
FIG. 9 is a block diagram of a text labeling device according to an exemplary embodiment.

An exemplary embodiment of the present disclosure further provides a text labeling device with the structure shown in FIG. 9. The text labeling device includes a first input information processing module 901, a dynamic convolution module 902 and a labeling module 903.

The first input information processing module 901 is configured to process input information to obtain word embedding representation information of the input information.

The dynamic convolution module 902 is configured to perform dynamic convolution feature extraction on the word embedding representation information to obtain a classification result of each character from the word embedding representation information.

The labeling module 903 is configured to insert a label into the input information based on the classification result.

Figure 10:
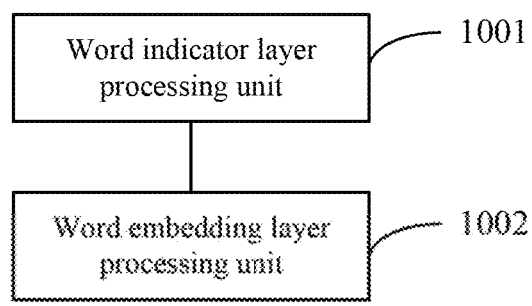
FIG. 10 is a structural block diagram of a first input information processing module 901 according to an exemplary embodiment.

Optionally, the first input information processing module 901 has the structure shown in FIG. 10, and includes a word indicator layer processing unit 1001 and a word embedding layer processing unit 1002.

The word indicator layer processing unit 1001 is configured to convert each character in the input information into its own unique word indicator.

The word embedding layer processing unit 1002 is configured to perform word embedding layer processing on the word indicator, to obtain a word embedding representation corresponding to each word indicator, and form word embedding representation information of the input information.

Figure 11:
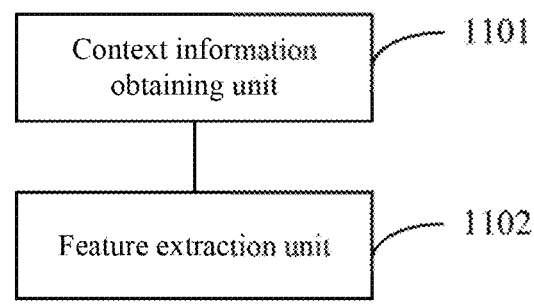
FIG. 11 is a structural block diagram of a dynamic convolution module 902 according to an exemplary embodiment.

Optionally, the dynamic convolution module 902 has the structure shown in FIG. 11, and includes a context information obtaining unit 1101 and a feature extraction unit 1102. The context information obtaining unit 1101 is configured to use word embedding layer information in a time window corresponding to each character as the context information for feature extraction. The feature extraction unit 1102 is configured to perform dynamic convolution feature extraction on the context information to obtain the classification result of each character from the word embedding representation information.

Figure 12:
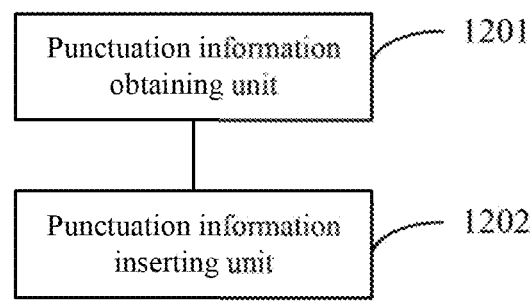
FIG. 12 is a structural block diagram of a labeling module 903 according to an exemplary embodiment.

Optionally, the labeling module 903 has the structure shown in FIG. 12, and includes a punctuation information obtaining unit 1201 and a punctuation information inserting unit 1202.

The punctuation information obtaining unit 1201 is configured to determine the punctuation information behind each character based on the classification result of each character.

The punctuation information inserting unit 1202 is configured to insert the punctuation information into the input information to be located behind the corresponding character.

Regarding the device in the above embodiment, the specific manner in which each module performs operations has been described in detail in the embodiment related to the method, and will not be elaborated herein.

An exemplary embodiment of the present disclosure further provides a computer device having a processor and a memory that is configured to store processor executable instructions. The processor is configured to process input information to obtain word embedding representation information of the input information, perform dynamic convolution feature extraction on the word embedding representation information to obtain a classification result of each character from the word embedding representation information, and insert a label into the input information based on the classification result.

Figure 13:
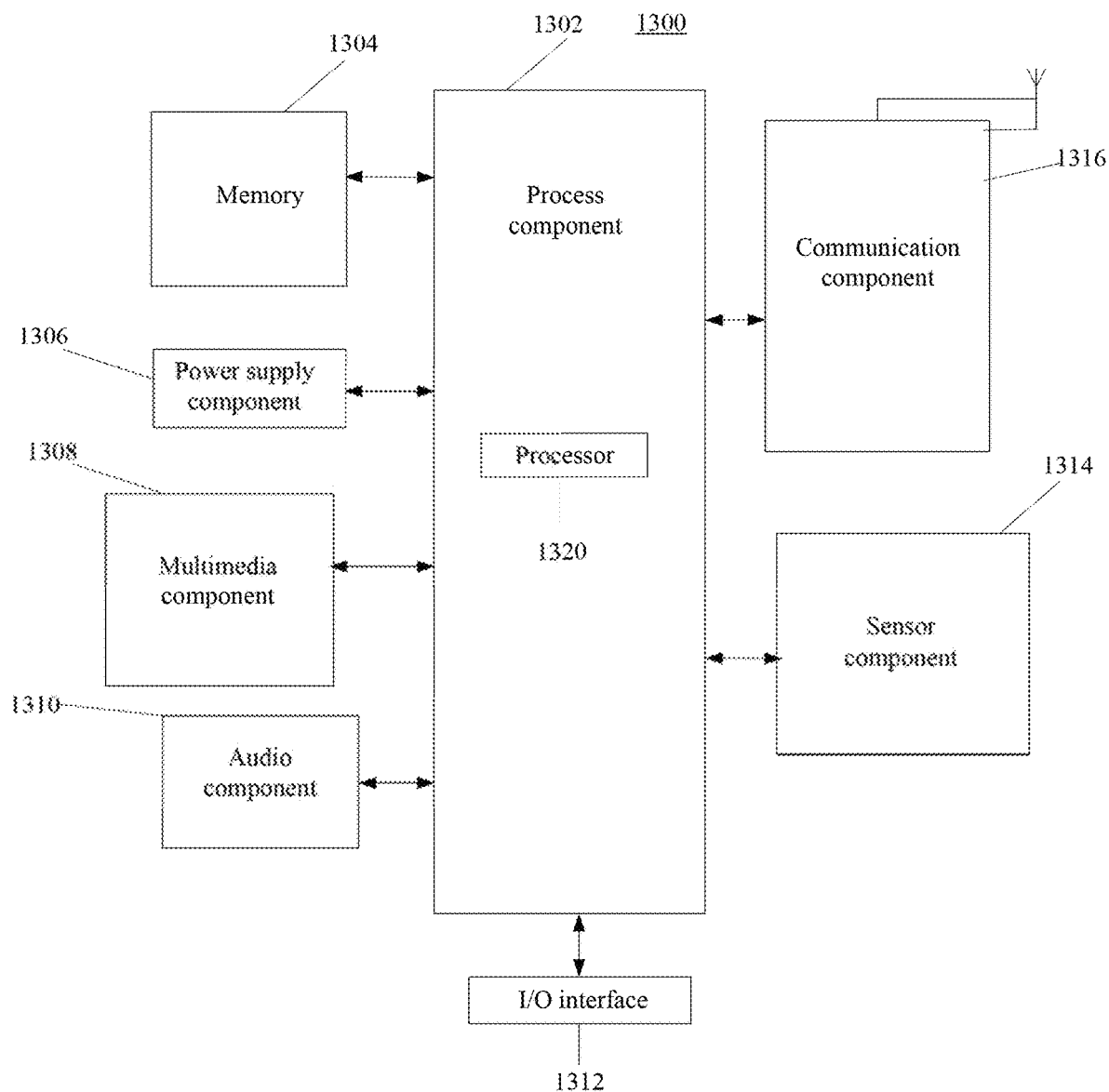
FIG. 13 is a block diagram of a device according to an exemplary embodiment showing a general structure of a mobile terminal.

FIG. 13 is a block diagram of a device 1300 for text labeling according to an exemplary embodiment. For example, the device 1300 may be a mobile phone, a computer, a digital broadcasting terminal, a messaging device, a game console, a tablet device, a medical device, a fitness device, a personal digital assistant, and the like.

Referring to FIG. 13, the device 1300 can include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 is generally configured to control the overall operations of the device 1300, such as operations associated with display, phone calls, data communications, camera operations, and recording operations. The processing component 1302 may include one or more processors 1320 to execute instructions to complete all or part of the steps of the above method. In addition, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support operations at the device 1300. Examples of these data include instructions for any application or method operating on the device 1300, contact data, phone book data, messages, pictures, videos, and so on. The memory 1304 may be implemented by any type of transitory or non-transitory storage apparatus or a combination thereof, such as static random access memory (SRAM), electrically erasable programmable read only memory (EEPROM), erasable and removable programmable read only memory (EPROM), programmable read only memory (PROM), read only memory (ROM), magnetic memory, flash memory, magnetic disk, or optical disk.

The power component 1306 is configured to supply power to various components of the device 1300. The power component 1306 may include a power management system, one or more power sources, and other components associated with generating, managing, and distributing power for the device 1300.

The multimedia component 1308 includes a screen for providing an output interface between the device 1300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, slide, and gestures on the touch panel. The touch sensor may not only sense the boundary of the touch or sliding action, but also detect the duration and pressure related to the touch or sliding operation. In some embodiments, the multimedia component 1308 includes a front camera and/or a rear camera. When the device 1300 is in an operation mode, such as a shooting mode or a video mode, the front camera and/or the rear camera may receive external multimedia data. Each front camera and rear camera may be a fixed optical lens system or have focal length and optical zoom capabilities.

The audio component 1310 is configured to output and/or input audio signals. For example, the audio component 1310 includes a microphone (MIC). When the device 1300 is in an operation mode, such as a call mode, a recording mode, and a voice recognition mode, the microphone is configured to receive an external audio signal. The received audio signal may be further stored in the memory 1304 or transmitted via the communication component 1316. In some embodiments, the audio component 1310 further includes a speaker for outputting audio signals.

The I/O interface 1312 provides an interface between the processing component 1302 and a peripheral interface module. The peripheral interface module may be a keyboard, a click wheel, or a button. These buttons may include, but are not limited to: a home button, a volume button, a start button, and a lock button.

The sensor component 1314 includes one or more sensors for providing the device 1300 with status assessments in various aspects. For example, the sensor component 1314 can detect the on/off state of the device 1300, and the relative positioning of components such as the display and keypad of the device 1300. The sensor component 1314 can also detect the position change of the device 1300 or one component of the device 1300, presence or absence of user contact with the device 1300, the orientation or acceleration/deceleration of the device 1300, and the temperature change of the device 1300. The sensor component 1314 may include a proximity sensor configured to detect the presence of nearby objects without any physical contact. The sensor component 1314 may also include an optical sensor, such as a complementary metal oxide semiconductor (CMOS) or a charge coupled device (CCD) image sensor, for use in imaging applications. In some embodiments, the sensor component 1314 may further include an acceleration sensor, a gyro sensor, a magnetic sensor, a pressure sensor, or a temperature sensor.

The communication component 1316 is configured to facilitate wired or wireless communication between the device 1300 and other devices. The device 1300 can access any wireless network based on a communication standard, such as WiFi, 2Q or 30 or a combination thereof. In an exemplary embodiment, the communication component 1316 receives a broadcast signal or broadcast related information from an external broadcast management system via a broadcast channel. In an exemplary embodiment, the communication component 1316 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1300 may be embodied as one or more application specific integrated circuits (ASICs), digital signal processors (DSPs), digital signal processing devices (DSPDs), programmable logic devices (PLDs), field programmable gate army (FPGA), controller, microcontroller, microprocessor or other electronic components, and be used to implement the above method.

In an exemplary embodiment, a non-transitory computer-readable storage medium including instructions, such as a memory 1304 storing instructions, is also provided. The above instructions can be executed by the processor 1320 of the device 1300 to implement the above method. For example, the non-transitory computer-readable storage medium may be a ROM, a random access memory (RAM), a CD-ROM, a magnetic tape, a floppy disk, an optical data storage device, or the like.

A non-transitory computer-readable storage medium, when instructions in the storage medium are executed by a processor of a mobile terminal, enable the mobile terminal to perform a method for text labeling, the method includes: processing input information to obtain word embedding representation information of the input information; performing dynamic convolution feature extraction on the word embedding representation information to obtain a classification result of each character from the word embedding representation information; and inserting labels into the input information based on the classification result.

Figure 14:
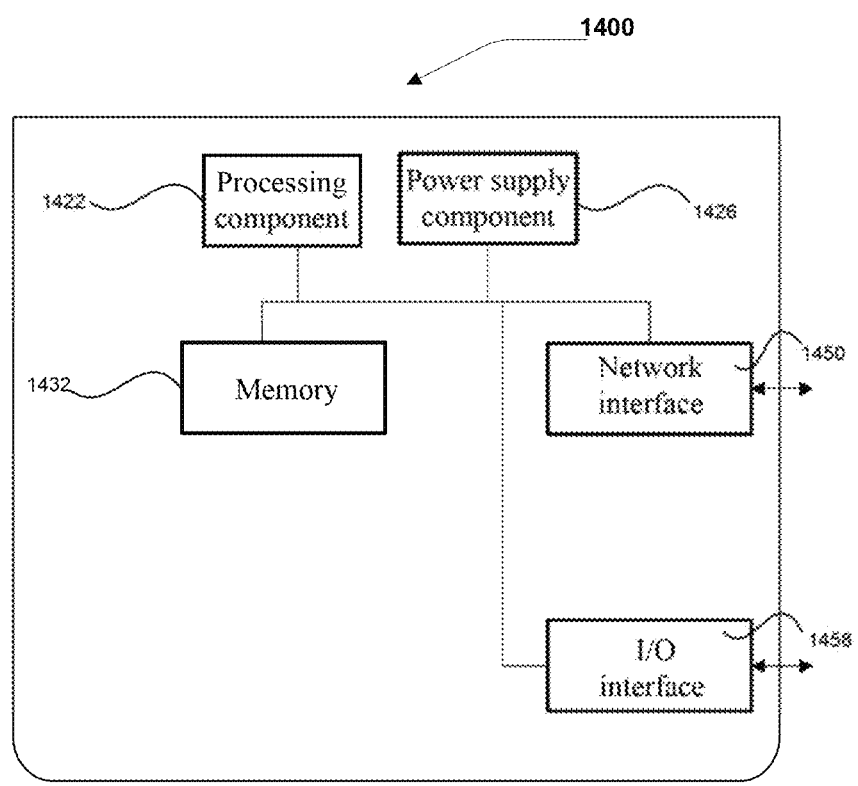
FIG. 14 is a block diagram of a device according to an exemplary embodiment showing a general structure of a server.

FIG. 14 is a block diagram of a device 1400 for text labeling according to an exemplary embodiment. For example, the device 1400 may be provided as a server. Referring to FIG. 14, the device 1400 includes a processing component 1422 having one or more processors, and memory resources represented by the memory 1432, for storing instructions executable by the processing component 1422, such as application programs. The application programs stored in the memory 1432 may include one or more modules each corresponding to a set of instructions. In addition, the processing component 1422 is configured to execute instructions to perform the above method.

The device 1400 may also include a power supply component 1426 configured to perform power management of the device 1400, a wired or wireless network interface 1450 configured to connect the device 1400 to the network, and an input/output (I/O) interface 1458. The device 1400 can operate based on an operating system stored in the memory 1432, such as Windows Server™, Mac OS X™, Unix™, Linux™, FreeBSD™, or the like.

The embodiment of present disclosure provides a method and device for text labeling. Through the method and device, the input information is processed to obtain word embedding representation information of the input information; the dynamic convolution feature extraction is performed on the word embedding representation information to obtain the classification result of each character from the word embedding representation information; and then labels are inserted into the input information based on the classification result. Through the dynamic convolution feature extraction, accurate and efficient punctuation labeling is realized, and the problem of low efficiency and low accuracy in feature extraction process is solved.

The method of feature extraction based on dynamic convolution is suitable for adding punctuations in the text and labeling tasks automatically, and fully takes the scene requirements of adding punctuations and other labels into consideration. Therefore, compared with the method based on recurrent neural network and self-attention mechanism, the method of feature extraction based on dynamic convolution has the advantage of high speed and accuracy.

After considering the description and practicing the disclosure disclosed herein, those skilled in the art will easily conceive of other embodiments of the disclosure. This application is intended to cover any variations, uses, or adaptive changes of the present disclosure that follow the general principles of the present disclosure and include common general knowledge or customary technical means in the technical field not disclosed in the present disclosure. The description and examples are to be considered exemplary only, and the true scope and spirit of the disclosure are defined by the following claims.

It should be understood that the present disclosure is not limited to the precise structure that has been described above and shown in the drawings, and various modifications and changes can be made without departing from the scope thereof. The scope of the disclosure is only limited by the appended claims.

What is claimed is:

1. A text labeling method, applied to a dynamic convolution neural network, comprising:
processing input information to obtain word embedding representation information corresponding to the input information, wherein the word embedding representation information is obtained at a word embedding layer;
performing dynamic convolution feature extraction on the word embedding representation information in a dynamic convolution layer, to obtain a classification result of each character from the word embedding representation information, comprising:
using word embedding layer information of the word embedding layer in a time window corresponding to each character as context information for feature extraction performed at a dynamic convolution layer; and
performing dynamic convolution feature extraction on the context information to extract features at the dynamic convolution layer, and obtaining the classification result of each character from the word embedding representation information based on extracted features;
and inserting a label into the input information based on the classification result;
wherein the processing the input information to obtain the word embedding representation information corresponding to the input information comprises:
converting each character in the input information into a unique word indicator of the character in a predefined word list based on the predefined word list and performing a word embedding layer processing on the word indicator to obtain a word embedding representation corresponding to each word indicator and form the word embedding representation information corresponding to the input information.

2. The text labeling method according to claim 1, wherein inserting the label into the input information based on the classification result comprises:
determining punctuation information behind each character based on the classification result of each character; and
inserting the punctuation information into the input information to be located behind a corresponding character.

3. The text labeling method according to claim 1, wherein inserting the label into the input information based on the classification result comprises:
determining punctuation information behind each character based on the classification result of each character; and
inserting the punctuation information into the input information to be located behind a corresponding character.

4. A text labeling device, applied to a dynamic convolution neural network, comprising a processor and a storage device for storing computer-executable instructions that, when executed by the processor, cause the processor to:
process input information to obtain word embedding representation information corresponding to the input information, wherein the word embedding representation information is obtained at a word embedding layer;
perform dynamic convolution feature extraction on the word embedding representation information in a dynamic convolution layer, to obtain a classification result of each character from the word embedding representation information, wherein the processor is further configured to:
use word embedding layer information of the word embedding layer in a time window corresponding to each character as context information for feature extraction performed at a dynamic convolution layer; and
perform dynamic convolution feature extraction on the context information to extract features at the dynamic convolution layer, and obtain the classification result of each character from the word embedding representation information based on extracted features; and
insert a label into the input information based on the classification result;
wherein the processor is further configured to:
convert each character in the input information into a unique word indicator of the character in a predefined word list based on the predefined word list and perform a word embedding layer processing on the word indicator to obtain a word embedding representation corresponding to each word indicator and form the word embedding representation information corresponding to the input information.

5. The text labeling device according to claim 4, wherein the processor is further configured to: determine punctuation information behind each character based on the classification result of each character; and insert the punctuation information into the input information to be located behind a corresponding character.

6. The text labeling device according to claim 4, wherein the processor is further configured to:

determine punctuation information behind each character based on the classification result of each character; and insert the punctuation information into the input information to be located behind a corresponding character.

7. A computer device, applied to a dynamic convolution neural network, comprising:

a processor; and a memory storing processor-executable instructions;

wherein, the processor is configured to: process input information to obtain word embedding representation information corresponding to the input information, wherein the word embedding representation information is obtained at a word embedding layer, perform dynamic convolution feature extraction on the word embedding representation information in a dynamic convolution layer, to obtain a classification result of each character from the word embedding representation information, wherein the processor is further configured to:

use word embedding layer information of the word embedding layer in a time window corresponding to each character as context information for feature extraction performed at a dynamic convolution layer; and perform dynamic convolution feature extraction on the context information to extract features at the dynamic convolution layer, obtain the classification result of each character from the word embedding representation information based on extracted features, and insert a label into the input information based on the classification result;

wherein the processor is further configured to:

convert each character in the input information into a unique word indicator of the character in a predefined word list based on the predefined word list: and perform a word embedding layer processing on the word indicator to obtain a word embedding representation corresponding to each word indicator and form the word embedding representation information corresponding to the input information.

8. A non-transitory computer-readable storage medium, wherein instructions in the storage medium, when executed by a processor of a mobile terminal, cause the mobile terminal to perform the text labeling method according to claim 1.

* * * * *